United States Patent [19]
Greiss et al.

[11] Patent Number: 5,631,957
[45] Date of Patent: May 20, 1997

[54] BAND-ENERGY NEAR-END ECHO REDUCER FOR TONAL SIGNALLING DETECTORS

[75] Inventors: Israel Greiss, Raanana; Rami Drucker, Herzlia; Gil Montag; Ophir Shabtay, both of Haifa; David Almagor, Herzlia B, all of Israel

[73] Assignee: National Semiconductor Corporation, Santa Clara, Calif.

[21] Appl. No.: 401,176

[22] Filed: Mar. 9, 1995

[51] Int. Cl.⁶ .................................................. H04M 11/00
[52] U.S. Cl. .......................... 379/406; 379/399; 379/408; 379/409
[58] Field of Search ................................. 379/406, 410, 379/409, 402, 386, 351, 282, 283, 399

[56] References Cited

U.S. PATENT DOCUMENTS

| | | | |
|---|---|---|---|
| 4,460,808 | 7/1984 | Battista et al. | 379/386 |
| 4,609,878 | 9/1986 | Rodgers | 330/136 |
| 5,132,963 | 7/1992 | Ungerboeck | 379/410 |
| 5,214,693 | 5/1993 | Chujo | 379/351 |
| 5,375,166 | 12/1994 | Odaohara | 379/97 |
| 5,400,394 | 3/1995 | Raman et al. | 379/410 |

FOREIGN PATENT DOCUMENTS

| | | |
|---|---|---|
| 0412691 | 2/1991 | European Pat. Off. . |
| 2640551 | 3/1978 | Germany . |

OTHER PUBLICATIONS

IEEE International Conference on Acoustic, Speech and Signal Processing, vol. 4, Mar. 1992, pp. 513–516, V. Raman, M Cromack, "Fast Echo Cancellation in a Voice-processing System".

Fast Echo Cancellation in a Voice–Processing System (Vijay R. Raman et al) IEEE Sep. 1992 (pp. IV–513–IV516).

*Primary Examiner*—Krista M. Zele
*Assistant Examiner*—Jacques M. Saint-Surin
*Attorney, Agent, or Firm*—Limbach & Limbach L.L.P.

[57] ABSTRACT

Near-end echo-reduction is achieved by passing a transmit signal through a first filter bank and feeding a remote signal plus an echo of the transmit signal through a second filter bank, then subtracting a gain-coefficient-compensated (scaled) version of the filtered transmit signal from the filtered-composite-remote signal to obtain an echo-reduced receive signal. The echo-reduced receive signal is suitably employed by tone decoders, voice response mechanisms, and the like, in a telephone system, and avoids false alarms due to near-end echo. In one embodiment, the gain coefficients are fixed for each frequency of interest. In another embodiment, the gain coefficients are dynamically arrived at based on the filtered transmit signal and the echo-reduced receive signal. The two filter banks can be combined in one, multiplexed filter bank.

11 Claims, 5 Drawing Sheets

BAND-ENERGY NEAR-END ECHO REDUCER FOR TONAL SIGNALLING DETECTORS

TECHNICAL FIELD OF THE INVENTION

The invention relates to near-end echo-cancellation in full-duplex telecommunications systems and, more particularly, to near-end echo cancellation in tonal signalling systems, especially Dual-Tone Multi-Frequency (DTMF) signalling systems which connect to the Public Switched Telephone Network (PSTN, also referred to herein as "phone lines").

BACKGROUND OF THE INVENTION

In electronic signalling systems which communicate over the PSTN, echoes of transmitted signals (e.g., attenuated remnants of transmitted voice or tone signals) can appear along with received signals. This is due primarily to conversions between 4-wire and 2-wire circuits.

Connections to the PSTN are 2-wire circuits in which transmitted and received signals are simultaneously carried over a single pair of wires (e.g., the phone lines). The transmitted and received signals are superimposed upon one another (i.e., additively) such that a composite, full-duplex signal appears on the two wires, permitting simultaneous transmission and reception. In order to separate received signals from transmitted signals, a 4-wire to 2-wire conversion circuit is employed. This conversion circuit is commonly called a "hybrid," and operates by subtracting the transmitted signal from the composite (transmitted and received) signal so that only the received signal remains.

Hybrid circuits, however, are not perfect, and some amount of transmitted signal usually leaks through into the received signal. For voice-only telephone equipment, this does not pose much of a problem. In fact, some near-end feedback (or echo) of one's own voice (often referred to as "sidetone") is considered highly desirable in telephone handsets, and is specifically designed into virtually all telephones. For communications equipment, however, (e.g., fax machines, modems, voice-response systems, etc.), such reflections are not desirable, and it is essential to suppress as much of the transmitted signal as possible in the received signal.

Figure 1:
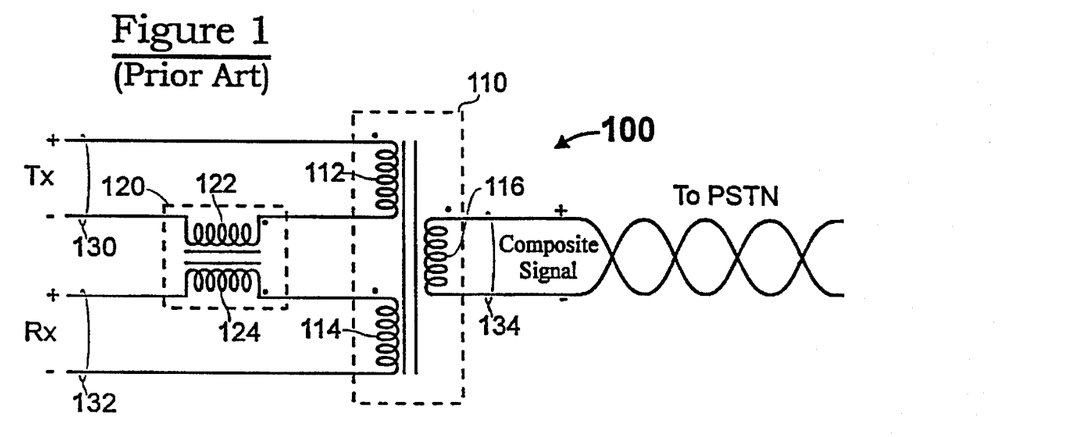
FIG. 1 is a schematic diagram of a typical prior-art hybrid circuit for converting between 2-wire and 4-wire circuits.

FIG. 1 is a schematic of a simple telephone (systems) hybrid 100. The hybrid 100 is made up of two transformers 110 and 120. The transformer 110 has two identical primary windings 112 and 114 and a single secondary winding 116. The secondary winding 116 connects to the 2-wire PSTN. The transformer 120 has a primary winding 122 connected in series with the primary winding 112 of the transformer 110 in a 2-wire transmit circuit 130. The transformer 120 also has a secondary winding 124 connected in series with the primary winding 114 of the transformer 110 in a 2-wire receive circuit 132. Any transmit signal in the transmit circuit 130 passes through the primary winding 112 of the transformer 110 and through the primary winding 122 of the transformer 120. The transmit signal passing through the primary winding 112 causes a similar transmit signal to be imposed upon the 2-wire PSTN circuit. This transmit signal also appears in a composite received signal at the winding 114 in the 2-wire receive circuit. The secondary winding 124 of the transformer 120 is connected such that an induced signal therein (caused by the transmit signal passing through the primary winding 122) "bucks" (or cancels) the transmit signal in the 2-wire receive circuit 132, such that most of the transmitted signal from the 2-wire transmit circuit 130 is eliminated from the 2-wire receive circuit 132. The hybrid circuit of FIG. 1 is merely representative of hybrid circuits in general. Other hybrid circuits have been used and are well known to those of ordinary skill in the art.

Echo-cancellation systems are well known to those of ordinary skill in the art, and include a wide variety of techniques for cancelling single or multiple echoes of varying intensity and delay. One of the best known applications of such techniques is the use of echo-cancellation to eliminate far-end audible echoes in voice telephony. Another well-known application of echo-cancellation is the elimination of both near-end and far-end echoes in data modems. These techniques generally require highly-sophisticated adaptive digital echo-cancellation algorithms which can be extremely computation-intensive.

In tonal signalling systems, particularly DTMF (Dual-Tone Multi-Frequency, also known as "Touch-Tone") signalling systems, such as voice messaging and voice response systems, it is highly desirable that tonal signal detection be accomplished at the same time as other information (usually a voice message) is being transmitted so that the tonal signal (e.g., a Touch-Tone button press) can be used to interrupt the transmitted information. That is, the tonal signalling system is expected to operate in a full-duplex mode. This is quite unlike the typical PSTN, where DTMF signalling (dialling) occurs without interference from any other significant signal source in a half-duplex mode of operation.

Many techniques are known for detecting sinusoids in general and DTMF signals in particular. One such technique employs a discrete Fourier transform known as Goertzel's algorithm to detect the presence of sinusoidal signals. Goertzel's algorithm can repetitively be applied to detect each of the DTMF frequencies.

In full-duplex tonal signalling systems, a principal source of difficulty in detecting DTMF signals is near-end echo (which has a relatively short delay time associated with it). The tonal signalling source (e.g., a DTMF telephone) is at the far-end of the PSTN and any tonal signals originating therefrom must pass through all of the attenuation sources in the network. Any far-end echoes of signals transmitted from the near-end of the network must also pass through the same attenuations. As a result, the effective "signal-to-noise" ratio of tonal signal to far-end echo is relatively good and is not a significant contributor to tonal detection errors. Relatively larger near-end echoes, however, are likely to adversely affect tonal signal detection and can only be dealt with effectively by an echo-cancellation scheme.

Generally speaking, echo cancellation schemes attempt to characterize the echoes of a transmitted signal by correlating a composite signal (which includes the transmitted signal and echoes thereof) with the transmitted signal to determine the nature and delay of the echoes. The echoes (or a subset of the echoes) are then eliminated from the composite signal by creating "duplicate" (virtual) echoes and by cancelling (e.g., subtracting) them from the composite signal. Such echo cancellation schemes attempt to eliminate both near-end and far-end echoes of the transmitted signal.

In voice response systems which incorporate speech recognition, it is likely that "command" words (which are subject to action when recognized) will occur in the outgoing message from the voice response system. If large-amplitude near-end echoes of these command words are not cancelled (i.e., echo-cancelled), then the speech recognition apparatus will recognize and act upon them as though they were received signals (rather than echoes of transmitted signals), causing undesired (and typically erroneous) results.

Figure 2:
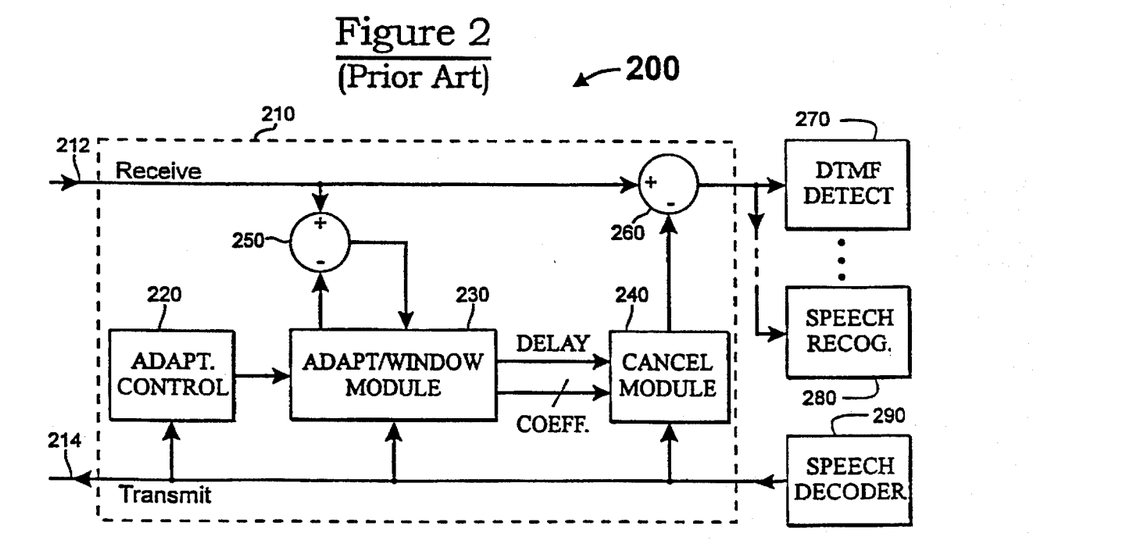
FIG. 2 is a block diagram of a prior-art technique for near-end echo-cancellation.

One approach to near-end echo cancellation is described in "Fast Echo Cancellation in a Voice-Processing System," by Vijay R. Raman and Mark R. Cromack, IEEE Publication Number 0-7803-0532-9/92, September 1992, at pages IV-513 through IV-516. FIG. 2 is a block diagram of the adaptive echo cancellation system 200 described therein.

In FIG. 2, the adaptive echo-cancellation system 200 consists of an echo canceller 210, a speech decoder (transmitter) 290, and two or more receivers (two are shown) 270 and 280. The receiver 270 is a DTMF decoder and the receiver 280 is a speech recognizer. Receive line 212 and transmit line 214 are assumed to come from a system hybrid. The receive line 212 carries a receive signal which has remnants (echoes) of a transmitted signal sent out over the transmit line 214. (Compare with receive and transmit circuits 132 and 130, respectively, in hybrid 100, FIG. 1).

The echo-canceller 210 includes two separate filters, i.e. an adapter filter and a canceller filter. The adapter filter includes an adaptive control function 220, an adapt/window module 230 and a difference function (e.g., adder) 250. The canceller filter includes a cancel module 240 and a difference function (e.g., adder) 260. The adapter filter (220, 230, 250) provides essentially a system identification function, because it does not adapt in real-time on all samples of receive and transmit data. The adaptation operates only on buffered frames of time-aligned transmit and receive data. The completion of adaptation for a frame of data is spread out in time over a number of elapsed frames.

The adaptation control function 220 and adapt/window module 230 form an adaptive filter which determines the appropriate delay and coefficients to be used for cancellation by monitoring the transmit and receive lines 214 and 212, respectively, and producing filter coefficients which, when applied to the transmit signal on the transmit line 214, produce an adaptive filter output which closely matches the transmit signal echo in the receive signal on the receive line 212. This adaptive filter output is then subtracted from the received signal via the difference function 250. The difference is then monitored by the adapt/window module 230 which tunes the filter coefficients for a minimum difference signal. The adapter filter (220, 230, 250) has available more and higher-resolution coefficients than the cancellation filter (240, 260). The adapt/window module 230 includes a windowing function which selects a subset of the available filter coefficients and delay constants based upon an energy concentration technique. Using this technique, a small set of coefficients and delay constants is selected to have the greatest effect on the highest energy components of the filtered signal. Filter coefficients and delay constants which affect only low-energy signal components are discarded. This effectively produces a filter which "windows" or selectively targets only the highest energy components (i.e., the largest amplitude reflections) in the filtered signal. The "windowed" filter coefficients and delay values are then passed to the cancel module which uses them to produce an echo-cancellation signal. The echo cancellation signal is subtracted from the received signal in the difference function 260 in an open-loop fashion.

In the echo-cancellation scheme shown and described above with respect to FIG. 2, adaptation is only performed off-line, in a non-real-time manner on buffers that pass a minimum power requirement. Such a scheme has several disadvantages. First, the adaptation can only be performed off-line, and requires completely separate filters for adaptation and cancellation. If implemented in a DSP (Digital Signal Processor) this would mean that separate program memory and coefficient storage are required for each of the two filters. Since adaptation and cancellation do not occur in parallel, there must be a "line acquisition" phase during which the process of adaptation occurs. During this phase, there can be no communication, and consequently no DTMF or other tonal signal detection.

SUMMARY OF THE INVENTION

It is an object of the present invention to provide a technique for near-end echo-reduction which cancellation is continuously active.

It is a further object of the present invention to provide a technique for near-end echo-reduction which does not require a separate acquisition phase.

It is a further object of the present invention to provide a technique for near-end echo-reduction wherein adaptation, cancellation and tone detection can occur simultaneously.

It is a further object of the present invention to provide a technique for near-end echo-reduction which does not require separate and distinct adaptation, cancellation and tone detection filters.

It is a further object of the present invention to provide a low cost technique for near-end echo-reduction.

It is a further object of the present invention to provide a technique for near-end echo-reduction which converges rapidly.

It is a further object of the present invention to provide a technique for near-end echo-reduction which can be used in a non-adaptive fashion.

It is a further object of the present invention to provide a technique for near-end echo-reduction which is insensitive to phase and delay variations.

It is a further object of the present invention to provide a technique for near-end echo-reduction in a tonal signalling system used over the Public Switched Telephone Network (PSTN) and operating in a duplex mode of operation by the utilization of tonal-signalling filters consuming only small amounts of memory (code and variables) and processing power.

It is a further object of the present invention to provide a technique for near-end echo-reduction in any tonal signalling receiver that is based on any structure of bandpass filtering followed by an integration.

It is a further object of the present invention to provide a technique for near-end echo-reduction which improves the performance of voice-fax systems.

According to an aspect of the invention, an echo-reduced receive signal (Rx) is obtained by filtering and squaring a transmit signal (Tx), filtering and squaring a remote signal (R) which also contains an echo (ES) of the transmit signal, and subtracting a filtered and gain-coefficient adjusted version of the transmit signal from the composite remote signal (R+ES).

According to another aspect of the invention, the band energy of the transmitted and received signals is measured by a dual filter bank (i.e., one bank for the received (remote) signal and one bank for the transmitted signal). When the banks are identical, the usage of one bank (twice) saves the storage memory for the other bank coefficients. The receive bank includes the tonal signalling detector filters. The echo interference is reduced by subtracting the scaled measure of the transmitted energies from the received ones.

According to a further aspect of the invention, a fixed delay line can be used to compensate for the analog and digital delays (codec) that are present in the system line interface module. However this delay-line is not mandatory, because the method of the present invention is insensitive to delay variations. The scaling factors may be set by and adaptive algorithm (e.g., LMS, RLS, etc.), or may be pre-defined in a non-adaptive manner.

According to yet another aspect of the present invention, a multi-tone decoding system can be implemented using the inventive technique. A plurality of tone detectors employing the echo-reduction technique of the present invention is connected in parallel to a receive signal and a transmit signal from a system hybrid. Each tone detector detects a sinusoidal tone at a different frequency. A tone logic function examines the output of the tone detectors to determine the presence or absence of tones in the received signal at the tone detector frequencies (frequencies of interest) and responds to specific, predefined combinations of tones.

Other objects, features and advantages of the present invention will become apparent in light of the following description thereof.

The invention is applicable, for example, in the context of answering machines connected to the telephone network. Such machines can often be controlled by the user from a remote telephone by DTMF signalling (i.e., by pressing keys on the keypad of the remote telephone), which often must occur during playback of the outgoing message. This is exemplary of cases where echoes can occur during playback of outgoing messages (such as stored greetings and other voice messages) due to the existence of near-end echoes (e.g., in the system hybrid). These echoes are the primary cause of poor DTMF detection (e.g., in the telephone answering machine) in the presence of outbound speech.

Tonal detection quality can be evaluated using two criteria: how accurately incoming DTMF tones (signals) are distinguished, and how well echoed DTMF signals (such as those on a message of an answering machine in a playback mode) are ignored. The present invention efficiently and effectively attenuates echoes in the DTMF band, thus improving the quality of DTMF detection. Moreover, since a separate and distinct (from echo-cancellation) set of filters is not required for tonal detection, the integrated function-ality of echo-reduction and tonal detection, which may be accomplished with a single set of filters according to the present invention, is readily and economically integrated into systems such as telephone answering machines.

BRIEF DESCRIPTION OF THE DRAWINGS

Reference is made hereinafter to preferred embodiments of the invention, examples of which are illustrated in the accompanying drawings. Although the invention will be described in the context of these preferred embodiments, it should be understood that it is not intended to limit the spirit and scope of the invention to these particular embodiments.

DETAILED DESCRIPTION OF THE INVENTION

Figure 3A:
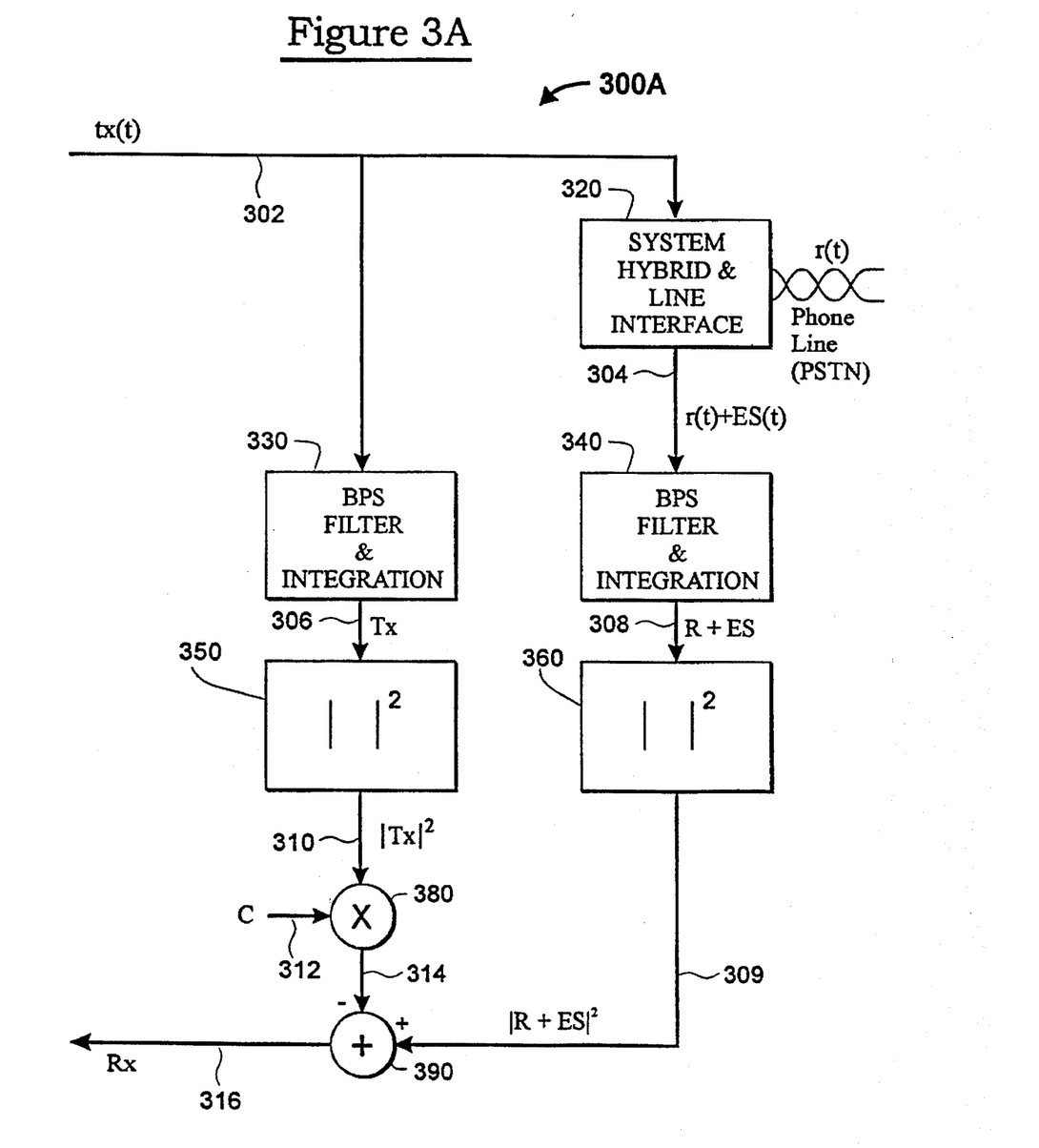
FIG. 3A is a block diagram of a technique for near-end echo reduction with non-adaptive compensation gain, according to the invention.

FIG. 3A is a block diagram of a system 300A having fixed compensator gain for reducing near-end echoes and detecting tone signals. The system 300A employs a dual-bank BPS Filter and Integration scheme, wherein one filter bank is used to process received (incoming) signals while the other is used to process transmitted (outgoing) signals, and the outputs of the two filter banks are combined to eliminate near-end echoes of the transmitted signals.

The system 300A includes a conventional system hybrid and line interface 320 (compare FIG. 1) providing separate lines for received and transmitted data. The line interface portion of the system hybrid and line interface 320 is a codec (coder/decoder) which converts analog telephone signals to/from digital form for digital processing by the system 300A.

A transmitted signal tx(t) on a line 302 is sent out over the PSTN (Phone Line) via the system hybrid and line interface 320. Incoming (remote) signals r(t) are received from the phone line by the system hybrid and line interface 320. The total signal received by the system hybrid and line interface, and present on the line 304, is a combination of the remote signal r(t) and a near-end echo component ES(t) of the transmitted signal 302. The echo component ES(t) is due to imperfect cancellation of all echo components of the transmitted signal (on line 302) in the system hybrid and line interface 320. The general object of the present invention is to reduce interference of the echo signal with the decision process of subsequent tonal detection circuitry (not shown).

In addition to being transmitted via the system hybrid and line interface 320, the transmit signal on the line 302 is provided to a BPS Filter and Integration block 330. An output signal Tx on line 306 from the BPS Filter and Integration block 330 is passed through a magnitude squared functional block 350 which calculates the square of the absolute value of the output 306 of the BPS Filter and Integration block 330 and outputs the signal $|Tx|^2$ on line 310. Throughout the description of the invention, "functional blocks" are elements that can be implemented in hardware or in software.

The composite remote signal r(t)+ES(t) on the line 304 is provided to another BPS Filter and Integration block 340. An output signal R+ES on a line 308 from the BPS Filter and Integration block 340 is passed through a magnitude squared function 360 which calculates the square of the absolute value of the output R+ES of the BPS Filter and Integration block 340, and outputs a signal $|R+ES|^2$ on a line 309.

The BPS Filter and Integration block 330 and the squarer 350 form a first filter bank for processing the transmitted signal tx(t). The BPS Filter and Integration block 340 and the squarer 360 form a second filter bank processing the composite remote signal r(t)+ES(t). The function and operation of the BPS Filter and Integration blocks (330, 340) is described in greater detail hereinbelow with respect to FIG. 4. Generally, the outputs of the first and second filter banks are processed to eliminate the echo term ES(t) from the composite remote signal r(t)+ES(t), so that subsequent decoders and the like (not shown) are presented with a "pure" received signal (R).

The output $|Tx|^2$ of the magnitude squared function 350 is multiplied by a compensator gain coefficient "C" impressed upon input line 312 to a multiplier function 380. The multiplication result is a signal on line 314 which is subtracted in a summing function 390 from the output on the line 309 of the magnitude squared function 360 to produce an echo-reduced received signal (Rx) on a line 316. Again, the "functions" referred to herein may be implemented in either hardware or in software.

The band energy of the transmitted and received signals 302 and 304 is measured by the two filter banks (i.e., function blocks 330 and 350 for the transmit signal 302, and function blocks 340 and 360 for receive). The two filter banks can be made identical to one another so that a single filter bank can be multiplexed to perform the function of both the transmit filter bank and the receive filter bank. This would save on the amount of storage which would otherwise be required for separate sets of filter coefficients for two discrete filter banks.

The filter banks behave as bandpass filters, passing only a narrow band of frequencies about a frequency of interest (e.g., a signalling tone). The receive filter bank acts as the signal tone detector. A sufficient output level at the echo-cancelled receive output Rx on line 316 indicates a "hit" at the selected frequency. Preferably, one filter bank is provided for each tone frequency to be decoded. Other implementations are possible, however, wherein one or more (e.g. both) of the filter banks are multiplexed. By multiplexing, a single filter bank can be used to scan more than one tone.

A fixed delay line can be used to compensate for the analog and digital delays (codec) that are present in the system hybrid and line interface module 320. However, such a delay-line is not mandatory, because the narrow frequency energy band to which the filters respond makes this method relatively insensitive to delay variations. For the system of FIG. 3A, the compensator gain factors (one compensation gain factor per frequency of interest) are chosen to minimize the amount of transmit signal leak-through based upon known system characteristics.

Alternatively, an adaptive technique can be employed to calculate dynamically-adjusted compensator gain coefficients. Such an embodiment of the invention is shown in FIG. 3B.

Figure 3B:
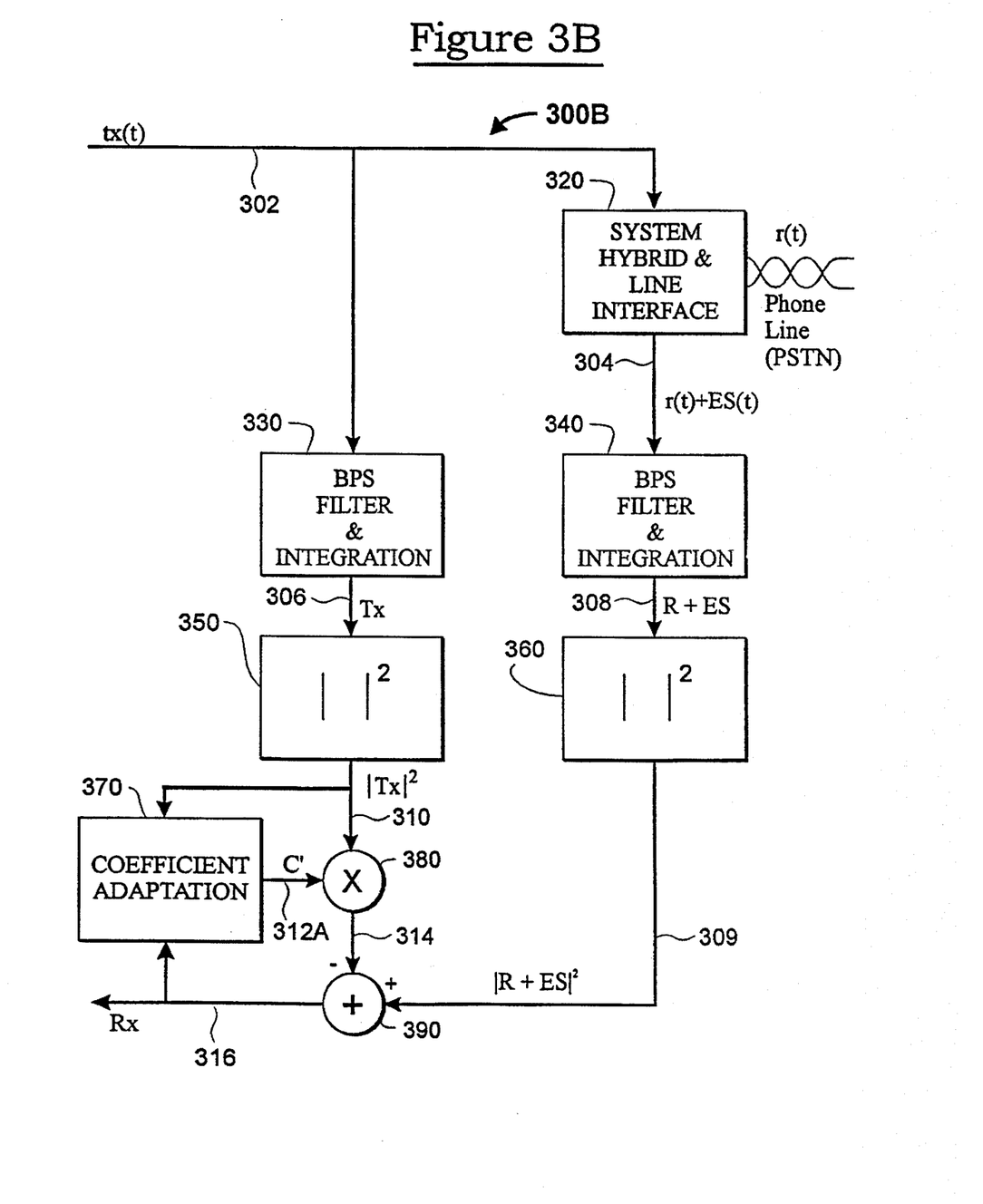
FIG. 3B is a block diagram of a technique for near-end echo reduction with adaptive compensation gain, according to the invention.

FIG. 3B is a block diagram of a system 300B for near-end echo reduction with adaptive compensation gain, according to the invention. It is identical to the system 300 of FIG. 3A in all respects except that a coefficient adaptation block 370 monitors the echo-cancelled receive output signal (Rx) on the line 316 and the output 310 of the magnitude squared function 350, and dynamically "tunes" an adaptive compensator coefficient C' presented on a line 312A to the multiplier 380 to minimize the amount of transmit signal leak-through (cross-talk) in the echo-cancelled received signal output onto the line 316.

In one embodiment of the invention, adaptation of the compensator gain coefficient (C') on line 312A is accomplished according to the following formula:

$$C_{m+1}=C_m+\mu Rx|Tx|^2$$

$$\mu=\mu_o/(|Rx|^2+|Tx|^2)$$

In the equation set forth above, the variable "m" is used as a block number to track the iteration.

Based on these teachings, it will be understood by those of ordinary skill in the art that there are many different goal-seeking algorithms which can be used to compute the compensator gain coefficients. It is within the spirit and scope of the present invention to use any suitable adaptation algorithm.

Figure 4:
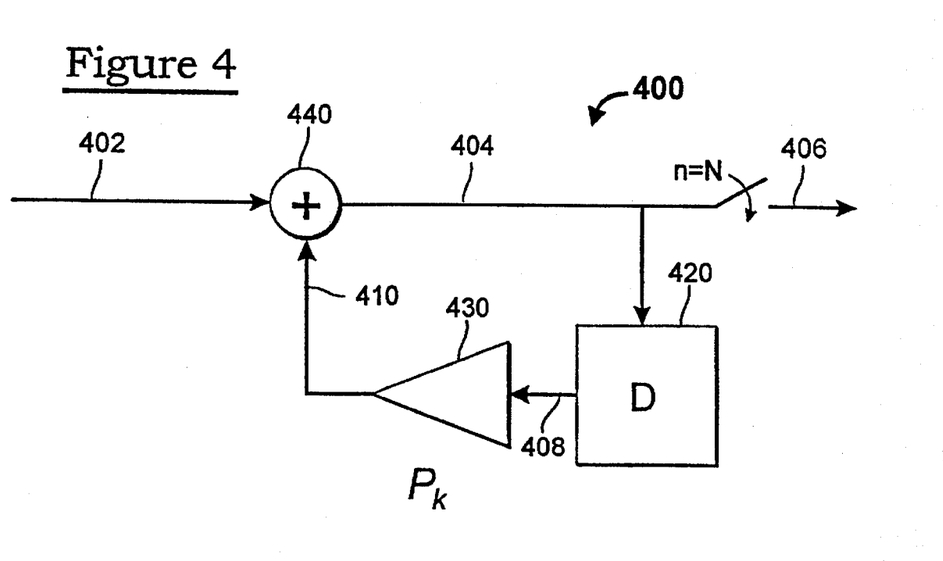
FIG. 4 is a block diagram of a BPS Filter and Integrator according to the invention.

FIG. 4 is a block diagram of a BPS (Bandpass) Filter and Integrator 400 (see 330 and 340 in FIGS. 3A and 3B), according to an embodiment of the present invention. The filter 400 is built around a feedback loop which includes a unit delay 420, a coefficient gain block 430 and summing function 440. An output 404 from the summing function 440 is delayed by one unit "D" in the delay block 420. The delayed output 408 from the delay block 420 is multiplied by a coefficient $P_K$ in the coefficient gain block 430. The value of the coefficient $P_K$ is given by:

$$P_K=r\cdot e^{j2\pi(f/fs)}$$

where r is a constant (e.g. 0.95) "f" is the required frequency (frequency of interest) and "fs" is the sampling rate.

The output of the coefficient gain block 430 is added to an input signal 402 (see 302 and 304 in FIGS. 3A and 3B) in the summing function 440 to produce the summing function output 404. An output from the BPS Filter and Integrator 400 is impressed on a line 406 once for every N samples. (This is illustrated by a "switch" which is closed when "n"="N").

Mathematical Description

Given the following definitions:

Echo signal=ES

Remote Signal=R

Echo emulation=EE=$C^*|Tx|^2$ where ES, R and Tx are complex numbers.

The echo signal ES is a complex number output by the BPS filter and Integrator 400, which represents the near-end echo portion of the transmit signal (Tx 302 which is also a complex number) which passes through the hybrid (320) and the remote signal (R which is also a complex number) such that the received signal (e.g., composite remote signal on line 304) is R+ES. The Tx signal (302), when bandpass filtered, integrated and squared is equal to the magnitude of the transmit signal in the frequency band of interest $|Tx|^2$. Multiplying by the compensation gain (C or C', depending upon canceller type) yields EE. Similarly, passing the remote signal with near-end echo through the filter/integration/squaring bank yields $|Rx+ES|^2$ After squaring the absolute values and subtraction of the residual, the Rx signal value for subsequent thresholding is obtained by detector decision logic, in the following manner:

$$|R_x|^2 = |ES+R|^2 - |EE|^2$$
$$= |ES|^2 + |R|^2 + (ES)^*R + ES(R^*) - |EE|^2$$

Assuming that the coefficient C (EE=$C^*|Tx|^2$) has reached its optimal value:

$$|EE|^2 \approx |ES|^2$$

and the Rx term is reduced to:

$$|R_x|^2 = |R|^2 + (ES)^*R + ES(R^*)$$
$$= |R|^2 + XT$$

where XT is the crosstalk term. The received error is given by:

$$\text{error}=|Rx|^2-|R|^2$$

The echo reducer changes the error term from $|ES|^2+XT$ to XT only. Since the common case is false tonal signal "hits" (false alarms) while $|R|<<|ES|$ in the band of interest, (i.e., XT<<1) the echo reducer produces very small error and is very effective in practical systems, especially at reducing the false alarm rate.

Figure 5:
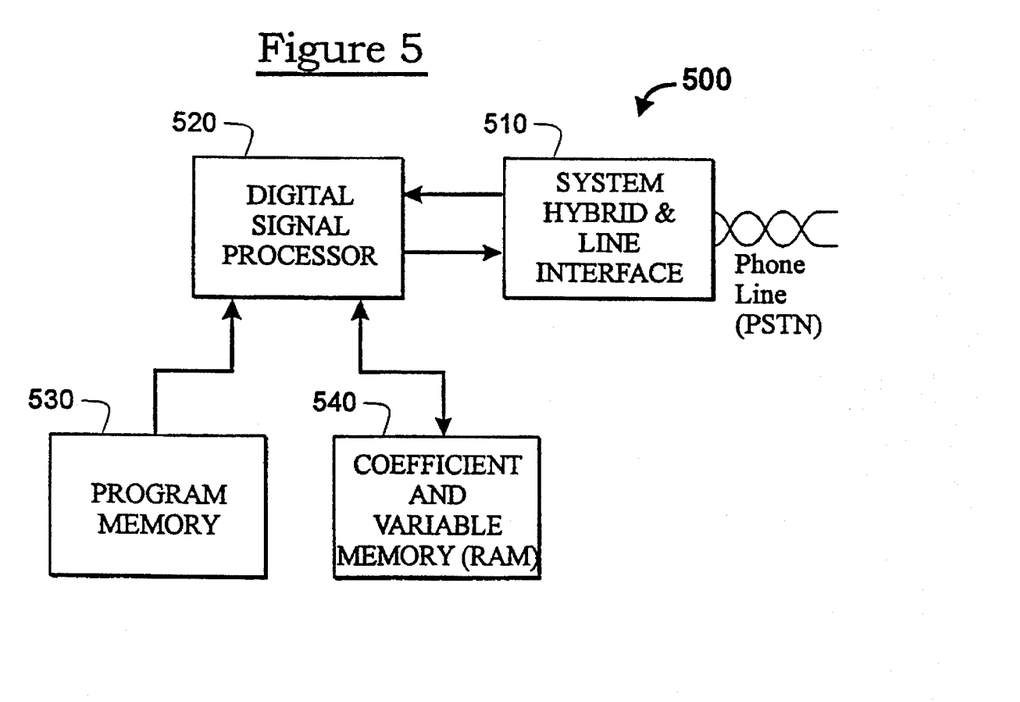
FIG. 5 is a block diagram of a system for implementing the technique of the present invention using a digital signal processor.

FIG. 5 is a block diagram of a system 500 for implementing the present invention using a Digital Signal Processor (DSP) wherein a DSP 520 transmits and receives signals over the PSTN via a System Hybrid and Line Interface 510, in much the same manner described hereinabove with respect to FIGS. 3A and 3B. The algorithmic hardware structure depicted in FIG. 3B is implemented on the DSP 520 by storing a program in a program memory 530 which represents the component functions of the algorithm. Coefficient and variable storage memory 540 is used to store tunable coefficients and to provide memory (history) for the filters. The techniques to implement any describable filter function are well known to those of ordinary skill in the art and, therefore, need not be further elaborated upon herein.

Figure 6:
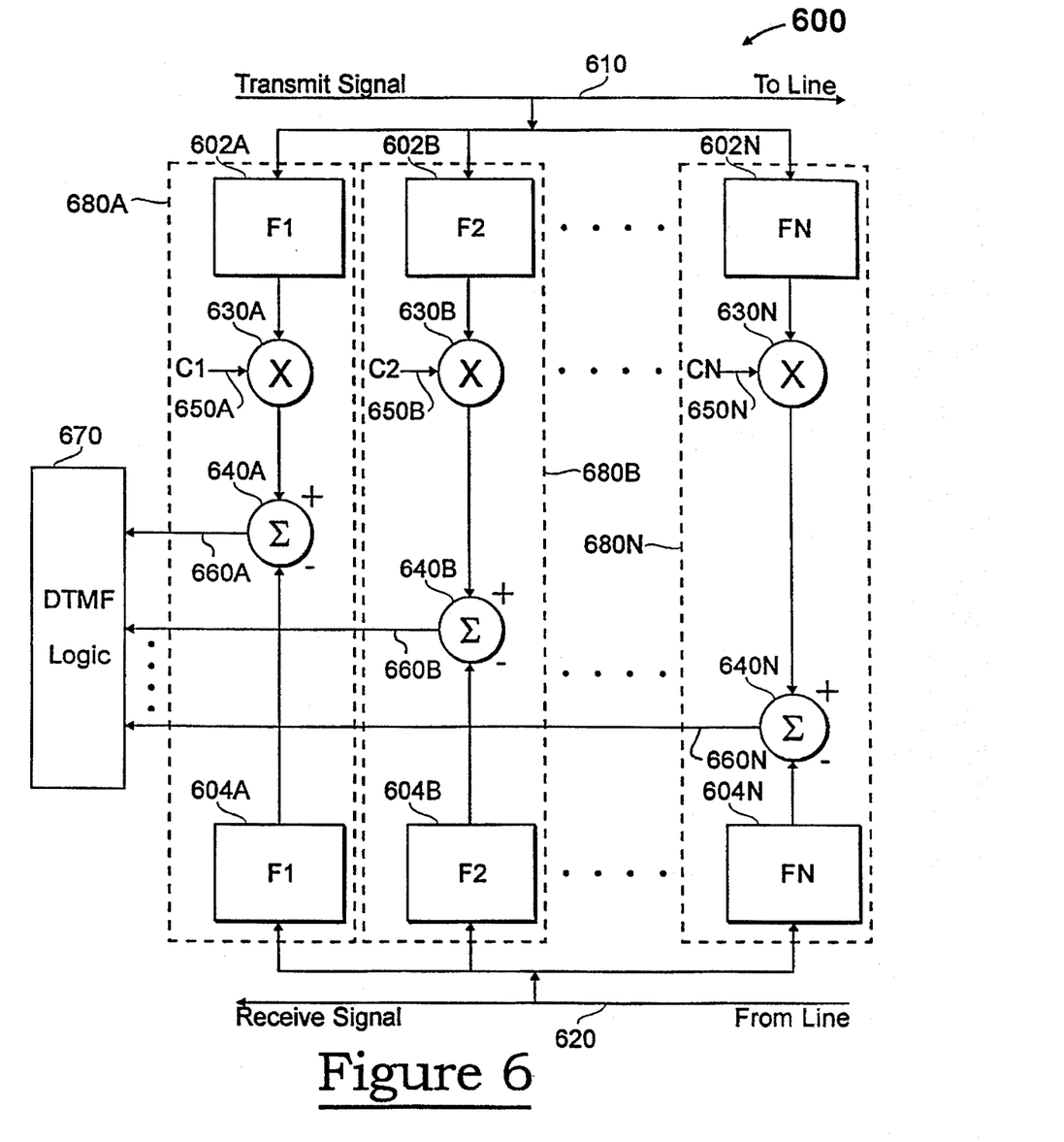
FIG. 6 is a block diagram of a technique for implementing dual tone multi-frequency (DTMF) decoding utilizing the echo-reduction technique of the invention.

FIG. 6 shows a multi-tone decoding system 600 utilizing the present inventive technique to detect a plurality of tones on a received signal on a line 620 in the presence of echoes of a transmitted signal on a line 610. The multi-tone decoding system 600 includes a plurality of tone detectors 680A, 680B, . . . 680N of the type shown and described hereinabove with respect to FIGS. 3A and 3B, and DTMF logic 670. Each tone detector 680A, 680B, . . . 680N detects a sinusoidal tone at a different, specific frequency, producing a corresponding detection output on a respective output line 660A, 660B, . . . 660N. The DTMF logic 670 determines the presence or absence of tones (e.g., combinations of specific tones) by comparing signal magnitudes on the tone detection outputs 660A, 660B . . . 660N against threshold values above which a tone is deemed to be present. The DTMF logic 670 responds to combinations of tones present on the tone detection outputs 660A, 660B, . . . , 660N, interpreting such combinations according to a predefined (e.g., conventional) set of tone combinations for which specific significance (i.e., pairs of tones are associated with specific keys on a telephone keypad) is defined.

Each tone detector 680A, 680B, . . . , 680N is connected to receive the transmit signal on the line 610 and to the receive signal on the line 620. The transmit signal in each tone detector 680A, 680B, . . . , 680N connects to a respective transmit filter and squarer 602A, 602B, . . . , 602N (compare 330 combined with 350, FIGS. 3A and 3B), and the receive signal in each tone detector 680A, 680B, . . . , 680N connects to a respective receive filter and squarer 604A, 604B, . . . , 604N (compare 340 combined with 360, FIGS. 3A and 3B). As described hereinabove with respect to FIGS. 3A and 3B, each tone detector 680A, 680B, . . . 680N includes a respective multiplier 630A, 630B, . . . 630N (compare 380, FIGS. 3A and 3B), which multiplies an output from the respective transmit filter 602A, 602B, . . . , 602N by a respective cancellation coefficient C1, C2, . . . , CN on lines 650A, 650B, . . . 650N (compare C of FIG. 3A or C' of FIG. 3B), to produce a result which is subtracted from an output of the respective receive filter 604A, 604B, . . . , 604N in a respective summing block 640A, 640B, . . . , 640N (compare 390, FIGS. 3A and 3B) to produce respective tone detection outputs on the lines 660A, 660B, . . . 660N.

Preferably, each transmit filter 602A, 602B, . . . , 602N (F1, F2, . . . FN) is identical to its respective receive filter 604A, 604B, . . . , 604N (F1, F2, . . . FN), such that the functions (F) of both the transmit and receive filters may be accomplished in the same filter implementation, i.e., each receive filter 604A, 604B, . . . , 604N and each corresponding transmit filter 602A, 602B, . . . , 602N can share a single corresponding physical filter implementation. However, each filter can be implemented separately, in a parallel configuration.

It will readily be appreciated by those of ordinary skill in the art that such sharing of filter embodiments is readily accomplished both in digital hardware and in software (e.g., on a digital signal processor) by switching or multiplexing a small set of stored values for the filter. Since the receive and transmit filters are preferably identical, no coefficient switching is necessary.

Although the invention has been illustrated and described in detail in the drawings and the foregoing description, the same is to be considered as illustrative and not restrictive in character—it being understood that only preferred embodiments have been shown and described, and that all changes and modifications that come within the spirit of the invention are intended to fall within the scope of the present invention as defined by the following claims.

What is claimed is:

1. Echo reducer for tonal signalling detectors, comprising:

a transmission line conveying transmit signals to a system hybrid connected to a phone line;

a reception line conveying remote signals from the system hybrid, said remote signals including a near-end echo of the transmit signals;

a first filter bank including a first bandpass filter for filtering and integrating the transmit signals and a first squarer for determining an absolute level of an output of the first bandpass filter, said first filter bank having a first output;

a second filter bank including a second bandpass filter for filtering and integrating the remote signals and a second squarer for determining an absolute level of an output of the second bandpass filter, said second filter bank having a second output;

a multiplier, connected to the first filter bank, for multiplying the first output by a compensator gain coefficient and producing a resultant signal; and an adder for subtracting the resultant signal from the second output, and producing a receive signal from which the near-end echo has been reduced.

2. Echo reducer, according to claim 1, further comprising:

a coefficient adaptation functional block for providing the compensator gain coefficient as a function of the first output and of the receive signal produced by said adder.

3. Echo reducer, according to claim 1, wherein:

the first filter bank and the second filter bank are provided as a single filter bank which is multiplexed between the transmit signals and the remote signals.

4. Echo reducer, according to claim 1, wherein the first bandpass filter further comprises:

an input line carrying the transmit signal to a first input of a summing block, said summing block having an output;

a delay block having an input connected to the output of the summing block, and having an output;

a coefficient gain block having an input connected to the output of the delay block, and having an output connected to a second input of the summing block, and operating iteratively on the output of the delay block with a given number of coefficients; and a switch for providing the output of the summing block as a bandpass filter output upon completion of iteratively operating on the output of the delay block with the given number of coefficients.

5. Echo reducer, according to claim 1, wherein the second bandpass filter further comprises:

an input line carrying the transmit signal to a first input of a summing block, said summing block having an output;

a delay block having an input connected to the output of the summing block, and having an output;

a coefficient gain block having an input connected to the output of the delay block, and having an output connected to a second input of the summing block, and operating iteratively on the output of the delay block with a given number of coefficients; and a switch for providing the output of the summing block as a bandpass filter output upon completion of iteratively operating on the output of the delay block with the given number of coefficients.

6. Method of minimizing an echo component from a remote signal, comprising:

passing transmit signals from a phone system through a system hybrid to a phone line;

passing remote signals from the phone line, said remote signals including a near-end echo of the transmit signals;

filtering and squaring the transmit signals;

filtering and squaring the remote signals;

multiplying the filtered/squared transmit signals by a a compensator gain coefficient and producing a resultant signal; and subtracting the resultant signal from the filtered/squared remote signals to produce an echo-cancelled receive signal.

7. Method, according to claim 6, wherein:

the compensator gain coefficient is fixed.

8. Method, according to claim 6, wherein:

the compensator gain coefficient is adaptively derived from the filtered/squared transmit signal and from the echo-cancelled receive signal.

9. Method, according to claim 6, further comprising:

performing the filtering and squaring of the transmit and remote signals with a single filter bank which is multiplexed to operate individually upon the transmit and remote signals.

10. A multi-tone decoder system comprising:

a plurality of tone detectors, each tone detector including:
a transmit filter function and a receive filter function,
a multiplier multiplying an output of the transmit filter function by a coefficient, said coefficient selected such that a given transmit filter detects a pre-defined frequency of interest,
an adder subtracting an output of the receive filter function from an output of the multiplier and providing a tone detection output indicative of a pre-defined tone at the pre-defined frequency of interest; and tone detection logic receiving the plurality of tone detection outputs and comparing the tone detection outputs against a detection threshold for each tone detection output to determine presence or absence of a pre-defined tone on each tone detection output.

11. A multi-tone decoder system according to claim 10, further comprising:

logic in the tone logic function providing an output for each of a pre-defined combination of pre-defined tones.

* * * * *